Sept. 22, 1959　　　M. L. DOELZ ET AL　　　2,905,812
HIGH INFORMATION CAPACITY PHASE-PULSE MULTIPLEX SYSTEM
Filed April 18, 1955　　　　　　　　　　　　7 Sheets-Sheet 1

INVENTOR.
MELVIN L. DOELZ
DEAN F. BABCOCK
BY
ATTORNEY

Sept. 22, 1959

M. L. DOELZ ET AL 2,905,812

HIGH INFORMATION CAPACITY PHASE-PULSE MULTIPLEX SYSTEM

Filed April 18, 1955

INVENTOR.
MELVIN L. DOELZ
DEAN F. BABCOCK
BY
*Marvin Moody*
ATTORNEY

INVENTOR.
MELVIN L. DOELZ
DEAN F. BABCOCK
BY
*Merin Moody*

ATTORNEY

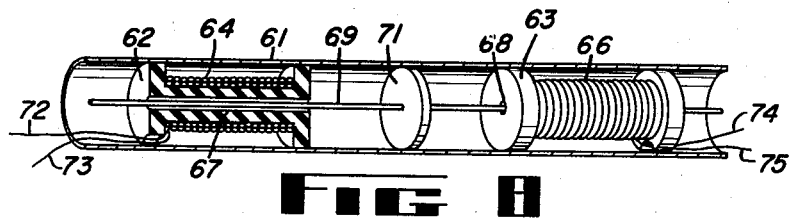
FIG 8
| | | |
|---|---|---|
| MASTER TIMER 16 | $t_1$ \| $t_2$ \| $t_3$ \| $t_4$ \| $t_5$ \| $t_6$ | A |
| RESONATOR 42 | 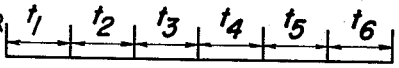 | B |
| RESONATOR 52 | 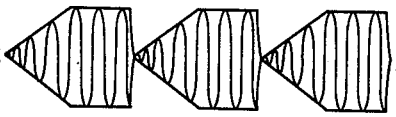 | C |
| SQUARE WAVE GENERATOR OUTPUT 1 TO GATE 54 | 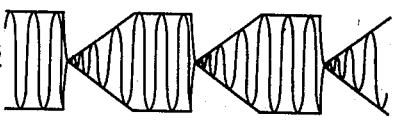 | D |
| SQUARE WAVE GENERATOR OUTPUT 2 TO GATE 44 | 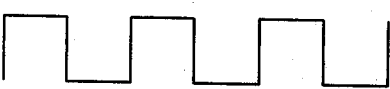 | E |
| MULTIVIBRATOR 58 |  | F |
| MULTIVIBRATOR 51 | 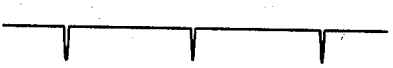 | G |
FIG 9
*INVENTOR.*
MELVIN L. DOELZ
DEAN F. BABCOCK
BY
*ATTORNEY*

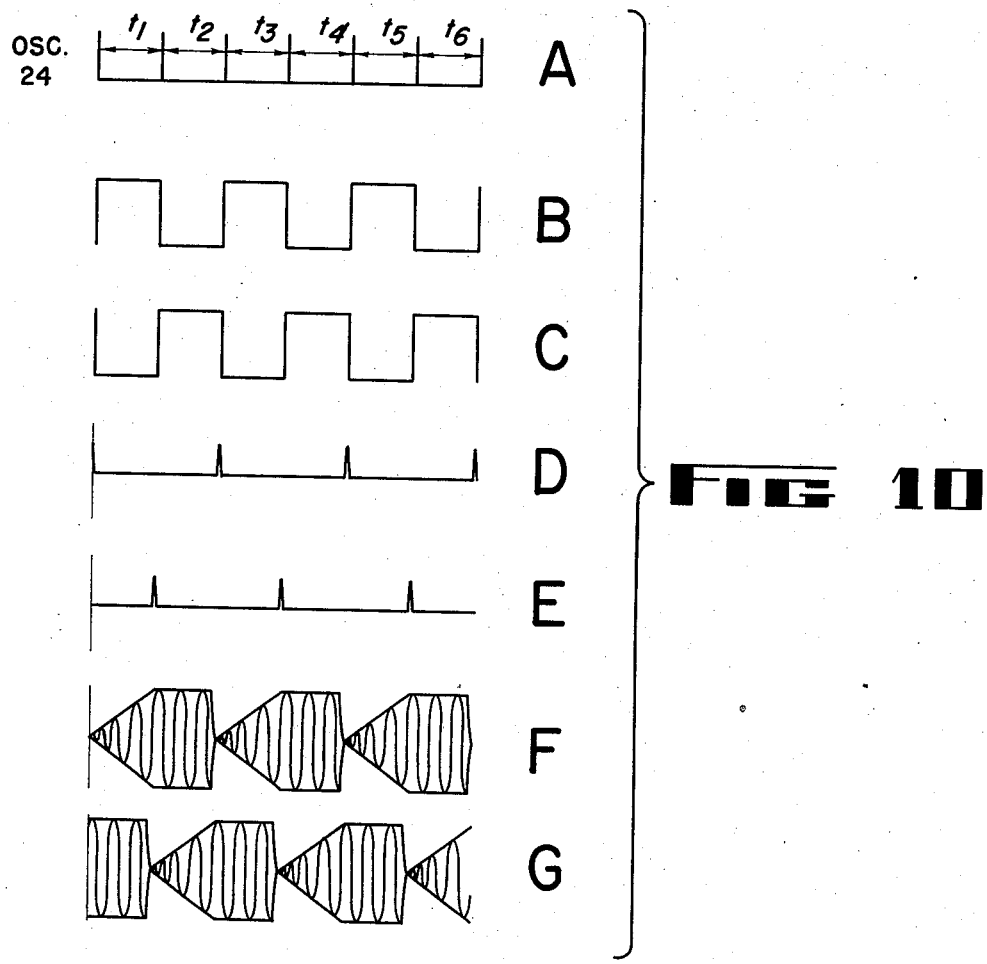

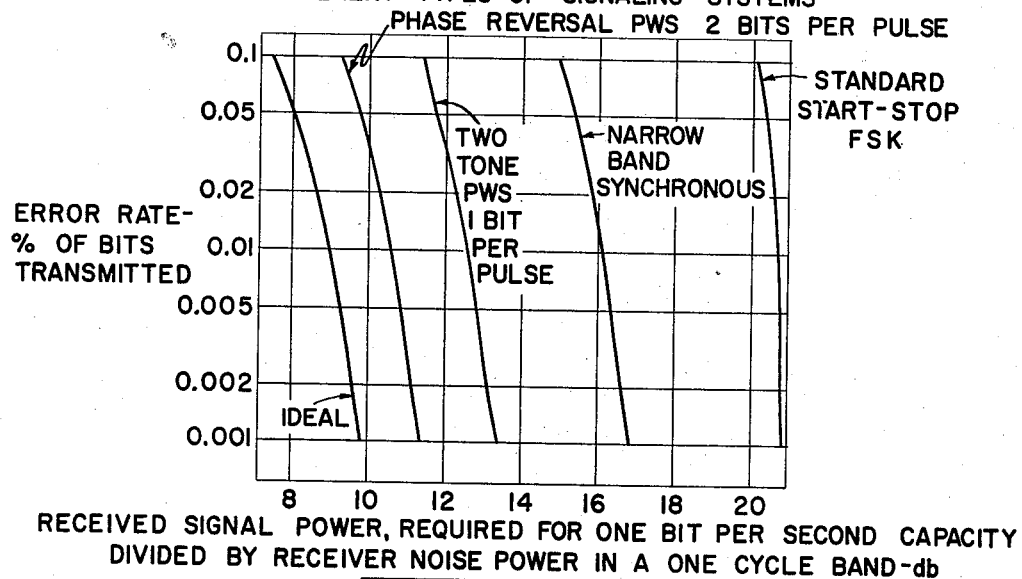
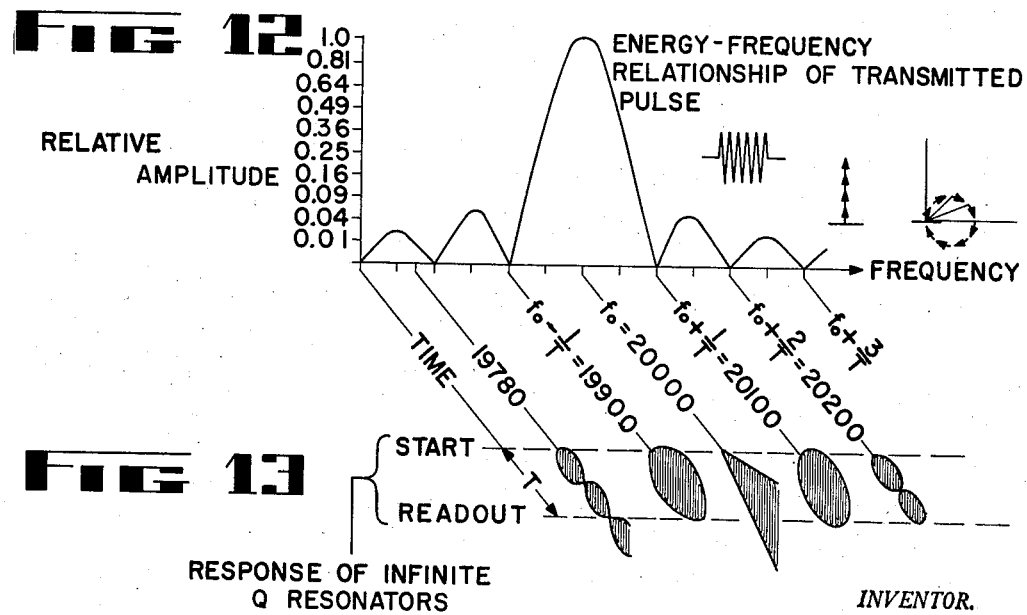

2,905,812

HIGH INFORMATION CAPACITY PHASE-PULSE MULTIPLEX SYSTEM

Melvin L. Doelz, North Ridge, and Dean F. Babcock, Tarzana, Calif., assignors to Collins Radio Company, Cedar Rapids, Iowa, a corporation of Iowa Application April 18, 1955, Serial No. 502,045

13 Claims. (Cl. 250—8)

This invention relates in general to a communication system and in particular to apparatus for transmitting messages in a manner so as to obtain maximum utilization of available bandwidth. Patent entitled, "Polar Communication System," to Melvin L. Doelz, Patent Number 2,676,245, issued April 20, 1954, discloses a system wherein information is transmitted by detecting change and lack of change of polarity in transmitted pulses. That is to say, if a change in polarity occurs between adjacent pulses a "mark" is recognized, whereas, if two adjoining pulses have the same phase, a "space" is recognized. This system allows information to be transmitted without the requirement of an absolute polarity reference. Each pulse acts as a reference for the succeeding pulse and the absolute phase is not critical.

The present invention is an improvement and an expansion of this system and comprises a system wherein the available bandwidth may be divided into a number of tones, and each tone comprises a polarity system that can carry plural channels. Thus, at least twice the amount of information may be carried on a single tone as normally occurs. This is accomplished by transmitting pulses on a given tone which may have any one of four phases relative to the prior pulse of the same tone. Each pulse can be resolved into components to give plural channels. Each component channel utilizes the principles of the preceding invention, Patent Number 2,676,245, to distinguish marks and spaces. Thus, each component channel utilizes change or lack of change of polarity to determine a "mark" or "space."

Each resultant output pulse for two channels per tone may have a phase that is 45, 135, 225, or 315 degrees with respect to the phase of the prior adjacent pulse of the same tone. This system accommodates two independent channels on a single tone.

Two thousand cycles per second of bandwidth may be used to transmit 40 channels of 100 words-per-minute teletypewriter information in a single voice channel by utilizing 20 tones spaced 100 cycles apart. Each tone carries two channels.

This system allows the frequency stability requirements to be less stringent in that the phase of each tone is compared with the phase of a preceding tone rather than to an absolute phase reference.

Further objects, features, and advantages of this invention will become apparent from the following description and claims when read in view of the drawings, in which:

Figure 8 illustrates a resonator used in this invention;

Figure 9 illustrates the wave shapes of the apparatus of Figure 4;

Figure 10 illustrates the wave shapes of the apparatus of Figure 5;

Figure 11 is a graph that compares different types of signaling systems;

Figure 12 is a plot of the energy versus frequency relationship of transmitted pulses; and, Figure 13 is a curve showing responses of resonators at different frequencies.

Figure 1:
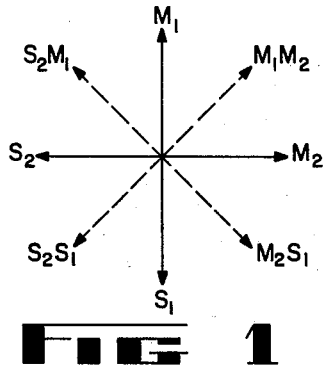
Figure 1 illustrates the coding pattern of phase shift modulation for two channels carried on a single tone.

Record communications such as radio teletype are normally accomplished by pulse or two-condition signaling. Business machine signaling likewise uses this method and it is expected that phase modulation will soon be widely employed for continuous signal functions such as voice and facsimile as well. Because of the general applicability of this form of signaling it is of importance to find ways to accomplish it with a minimum signal power and within a minimum bandwidth.

As a starting point it is interesting to see how much improvement over present practice is theoretically possible.

In 1928 Nyquist of BTL published the results of his theoretical analysis of the maximum rate at which telegraph information may be transmitted in a given bandwidth.

More recently Shannon, Oliver, and Pierce have given the maximum capacity of an ideal system as $$C_{max} = 2\ TW \log 2\left(\frac{S}{N}+1\right)$$

where $C_{max}$=The maximum information rate, bits per second,
$T$=Time of transmission, seconds,
$W$=Bandwidth, c.p.s.

$\frac{S}{N}$=signal-to-noise ratio

Such an ideal system will also require a minimum signal power in the presence of noise when the weighting function of the detector matches the signaling wave to operate with minimum bandwidth at a given information capacity. The left hand curve in Figure 11 gives the error rate of the ideal system as a function of $S/N$. This curve is given for a one bit per second signaling rate and in terms of the ratio of signal power to noise power per cycle of bandwidth so that direct comparison with practical systems employing various bandwidths and signaling rates can be made.

The right hand curve gives the performance of a conventional start-stop Frequency Shift Keyed Radio Teletype System.

The second curve from the right represents the performance of systems using narrow band filters and synchronous sampling as an example of the best operation to be expected with conventional techniques.

It is apparent that each of these systems falls short of the ideal performance in respect to required signal to noise. Also, these currently used systems occupy much more than the theoretically required spectrum bandwidth. This is a consideration of major importance in system planning for spectrum conservation.

The predicted wave system described herein is designed in such a way as to achieve ideal performance within close limits. It makes use of the following features:

(1) Rectangularly phase-pulsed sine waves.
(2) Encoding of two bits of information on each pulse by resolution of phase into quadrature components.
(3) Infinite Q resonators at the detector suitably gated to provide a perfect weighting function.

Before proceeding to relate these features to the problem of obtaining ideal performance, a functional description of the complete system will be given. It will then be described in its simplest and most efficient form. Later it will be shown what variations may be used to meet certain practical limitations, but which result in only slightly reduced effectiveness.

The signal source at the transmitter is a constant amplitude sine wave of high stability. Information is encoded by sending a different phase in successive equal intervals or pulses. Figure 1 illustrates the four quadrature phase combinations used so that each pulse may carry two bits of information. It will be seen that projection of the signal vector on the X axis yields one bit of information (either $M_2$ or $S_2$) and projection of the same vector on the Y axis yields a second bit (either $M_1$ or $S_1$). It will be assumed that the phase is changed rapidly in the transition from pulse to pulse and that the length of the vector and its relative phase is constant during each pulse. It is obvious that simple circuitry can be used in the transmitter.

The energy versus frequency distribution of such a transmitted pulse is indicated in Figure 12. It would be confusing to try to visualize a transmitted signal in terms of a carrier and sidebands, and this energy vs. frequency relation should be kept in mind instead, even though pulses at times may be repetitive in pattern.

Figure 3:
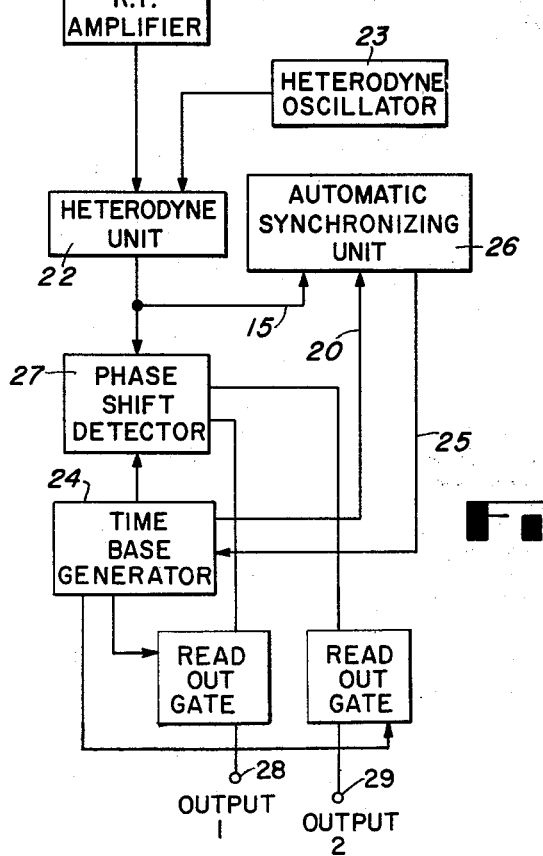
Figure 3 is a block diagram of the detector necessary to detect the information transmitted by the apparatus of Figure 2.
Figure 5:
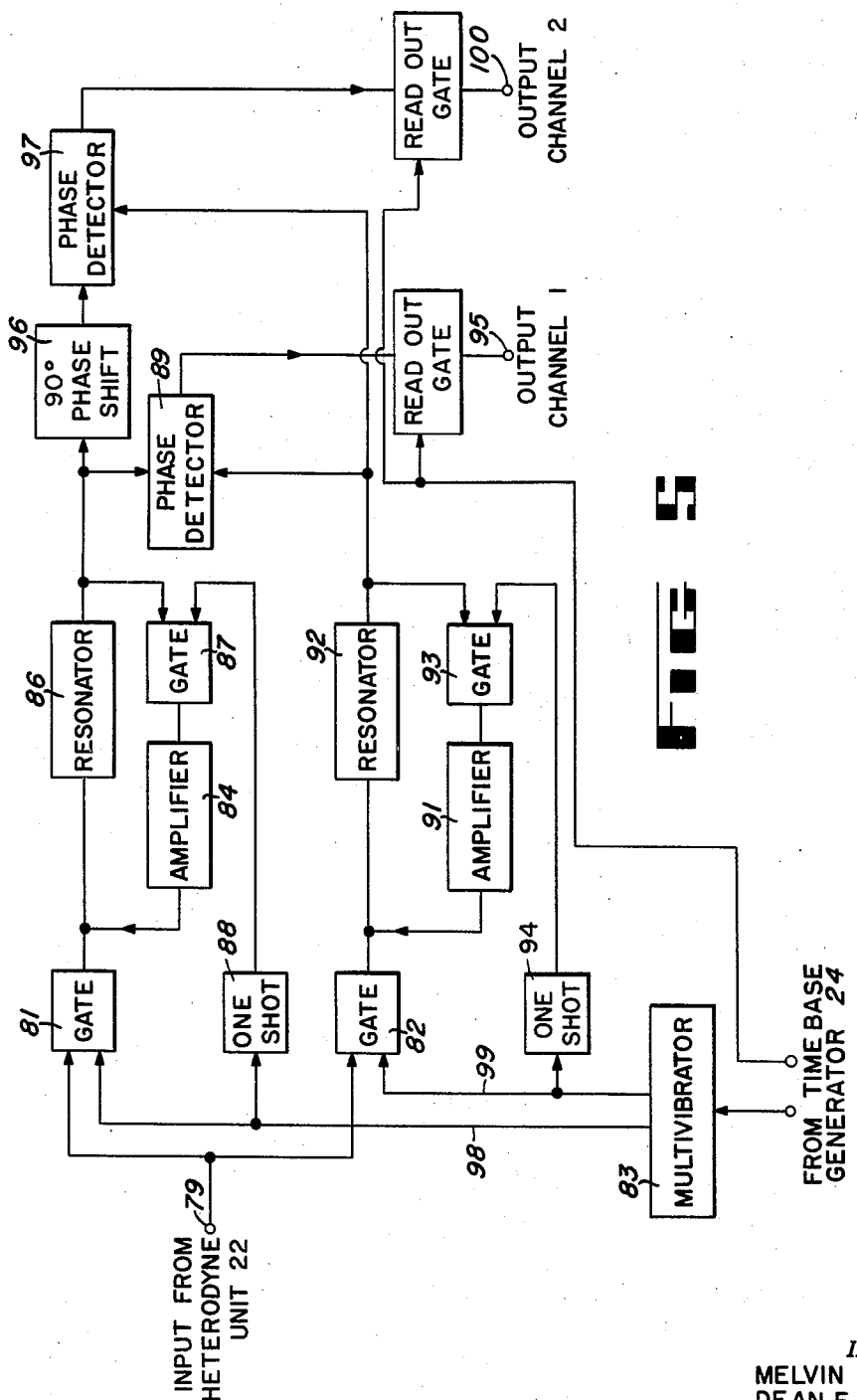
Figure 5 illustrates in detail the Phase Shift Detector of the receiver.

The receiving system is shown in Figures 3 and 5. It will be seen that while an input gate is open, the signal is amplified and passed to a high Q magnetostriction resonator tuned to the reference frequency. At the same time the input gate is opened, positive feedback is gated around the resonator and is so adjusted as to yield approximately infinite Q. As a result of the infinite Q, the signal amplitude at the resonator increases linearly throughout the pulse. The readout gate is opened briefly near the end of the pulse to transfer the final resonator voltage of the phase detectors, following which the negative feedback gate opens to quench strongly the resonator oscillation. Figure 13 shows the energy relations for different resonators having the illustrated frequencies. Obviously, no cross talk can occur from resonators at a null response at readout in Figure 13. As a result of this quenching there will be no carryover into the following pulse. The readout and quenching periods occupy in practice less than five percent of the pulse interval so that there is negligible loss of integration time during transmission. In the remainder of this part of the discussion the readout and quenching times will be neglected for simplicity in referring to the pulse time T. However, during the short readout interval, the phase detectors provide a voltage which is an integration of the signal throughout the pulse and compare it with a reference wave (assumed here to be in exact phase synchronism with the original transmitter reference wave). The readout signal is resolved by the phase detectors into X and Y components to yield two output bits of information as encoded at the transmitter.

Let us see why nearly ideal performance is obtained with such a system. The ideal signaling system curve in Figure 11 shows ideal performance attained by a system where $C=2TW$ and where the weighting function of the detector perfectly matches the signal. The predicted wave system makes use of a perfect weighting function for the rectangularly pulsed sine wave in the form of an infinite Q resonator gated in synchronism with the pulse. It remains to be shown that in the present system ideal performance may be expected:

(1) C is made to equal two bits per pulse by using the four quadrature phase positions to encode two bits independently on a single signal vector.

(2) T is defined as the transmitted pulse interval and is equal (neglecting the small readout and quench intervals) to the integration time at the receiver.

(3) $W=1/T$ if there is no cross talk from similar signals spaced in frequency $\pm 1/T$, $\pm 2T$, $\pm 3/T$, etc., away from the desired signal reference frequency. That $W=1/T$ is not immediately obvious. To prove that $W=1/T$, it must be shown that channels can be arranged as in a frequency multiplex system, spaced $1/T$ cycles apart in successive frequency intervals without cross talk. If there is found to be no cross talk, then the effective band W per channel is $1/T$. Demonstration of the freedom from cross talk is possible by reference to the amplitude-frequency diagram of the transmitted pulse and by examination of the response of the gated resonator as its frequency is varied. (Figures 12 and 13.)

The curve shown in Figure 12 is the amplitude versus frequency distribution of the transmitted pulse. The resonators are usually constructed at an intermediate frequency and, in order to provide a numerical example, the center frequency is shown as 20,000 cycles per second. Also for illustration the pulse length is indicated as being 1/100 second, giving $1/T=100$ cycles per second. At $f_0$ the amplitude response of the resonator at the desired frequency, 20,000 cycles per second, is indicated. It will be observed that the resonator amplitude builds up linearly to the readout point at the end of the pulse. At $$f_0 - \frac{1}{T} \text{ and } f_0 + \frac{1}{T}$$

19,900 and 20,100 cycles per second, the response of a resonator tuned to each of these frequencies is shown during the 20,000 cycles per second pulse. The amplitude first builds up and then descreases to zero at readout. Note that the curve which represents the energy distribution of the 20,000 cycles per second pulse has a null or "orthogonality" at each of these frequencies.

A similar result, namely, zero output at readout time, is obtained at 20,200 cycles per second, except that at this frequency the resonator is displaced two channels and its amplitude goes through two maxima and two zeroes. Corresponding results will be obtained if the resonator frequency is displaced by additional 100-cycle increments with the number of maxima and numbers of zeroes corresponding to the number of such increments the frequency is displaced.

The curve for 19,780 cycles per second indicates the response of a resonator which is not accurately centered at $f-2/T$. There is a residual voltage at readout time corresponding to the energy distribution indicated on the upper curve.

Of interest is the response of a resonator when both the desired and adjacent channel signals are transmitted. The output at readout time will be the same as it would be if the desired channel had been transmitted alone. However, during the pulse interval the resonator stored energy will vary as the vector addition of the signals for the channels taken individually. Similarly, if there are a large number of channels operating at once, the resonator will respond in complex fashion during the pulse, but at readout time will reach a value corresponding to the correct value for the desired channel alone.

Thus it is seen that it is possible to operate channels without mutual interference with a spacing of $1/T$; therefore, the bandwidth of each channel is $W=1/T$. Thus, in connection with the use of a proper weighting function, the requirements for ideal performance are satisfied.

Before showing practical system arrangements, a few of the salient features of the system will be listed.

(1) Although a frequency multiplex arrangement was used to demonstrate that $W=1/T$, the performance is basically identical with either time or frequency division. Signal to noise performance of a single channel is the same whether flanking channels are present or not.

(2) It is permissible to restrict the band emission of the transmitter by filtering to eliminate the side energy beyond about $\pm 3/T$. The amount of energy contained in the signal beyond this third orthogonality is so small that it can be trimmed off with small effect on operation. This feature is of importance in limiting inter-system interference.

(3) Adjustment of resonator feedback for "infinite" Q is not critical and normal circuit tolerances are sufficient provided the inherent Q and stability of the mechanical resonators is adequate.

(4) It is possible to choose different pulse lengths over a wide range merely by altering the timing signals and without readjusting other circuit constants. This makes it possible conveniently to change signaling speed and multiplexing arrangement to meet changes in traffic and transmission conditions.

(5) It should be noted that receiver selectivity is basically determined only by the quenched resonator with additional IF and RF selectively being required only for strong signal protection.

(6) Predicted wave yields a gain in signal to noise accompanied by a lowering of the threshold and a narrowing of the band. This is in marked contrast to the usual result in systems such as frequency modulation, where a gain in signal to noise is attained only by raising the threshold and widening the band.

The only important difficulty in applying the laboratory system just described to practical radio transmission is that of maintaining a reference wave in exact phase synchronism with the transmitter reference wave and adjusting for variations in phase delay which occur in the medium. One solution would be to transmit a pilot reference signal at low relative power, clean it up by filtering or automatic frequency control methods and then establish a local reference. The question arises, however, whether the pilot channel, if used as a heterodyning phase reference, would suffer the same perturbations as the signal channels. Because of this uncertainty and to simplify the apparatus, it has been found more convenient to use each pulse as received as a reference for the following pulse. This procedure is a good engineering solution because:

(1) It is to be assumed that the pulse length will be selected for any given system such that the phase changes expected in the medium will be small over one pulse length and, hence, will be nearly correct for analysis of the following pulse.

(2) Only a moderate degradation of performance (it works out to be 1.75 db) will result from the use of this form of "transmitted reference."

The system employed, then, which has been designated as Type A Predicted Wave Signaling is:

(1) Information is encoded as phase reversals (or non-reversals) in each of the two quadrature components, rather than as absolute phase values.

(2) Two resonators are used alternately at the detector. Each resonator is permitted to "ring" for one pulse interval as a means of storing a phase reference for analysis of the following pulse. It is then quenched and re-used.

(3) Phase measurements so obtained are decoded by phase detectors so arranged as to interpret the reversals from pulse to pulse as originally encoded.

A second system designated Type B Predicted Wave Signaling has also been used where it is desired to provide more phase and frequency tolerance between transmitter and receiver. In this system the reference wave is dispensed with altogether and only the magnitude rather than the phase of the readout vector is used. Two frequencies are used for mark-space determination. More bandwidth and signal power are required as indicated in the table which appears in Figure 11.

COMPARISON OF PREDICTED WAVE SIGNALING SYSTEMS

| Type PWS | Description | Frequency error for 2.0 db degradation | | Bandwidth compared to ideal | Relative performance, db |
|---|---|---|---|---|---|
| | | Relative to band length (T in seconds) | For 60 w.p.m. teletype, c.p.s. | | |
| A | Phase reversal | $\pm\frac{1}{34T}$ | $\pm 1.5$ | 1 | −1.75 |
| A | do | $\pm\frac{1}{9.5T}$ | $\pm 5.3$ | 2 | −3.0 |
| B | 2 tone, 1 bit per | $\pm\frac{1}{2.4T}$ | $\pm 21$ | 4 | −3.7 |

The signal to noise performance of these practical forms of the system are shown in comparison with conventional systems in Figure 11. The capacity of the Predicted Wave System can be illustrated by the fact that it is possible to multiplex forty-two 100-w.p.m. teleprinter circuits (total information rate 3150 bits per second) in a single voice band even after allowing suitable margins for delay distortion such as would be expected on long haul land lines on High Frequency radio systems.

One of the features of Predicted Wave Signaling is its adaptability to any form of pulse transmission, be it radio teletype, phase modulated code, etc. Both time division and frequency division multiplexing are equally feasible and it is often possible to provide for either or a mixture of both to accommodate the needs of a given problem. Long pulses (e.g., 22 milliseconds) may be used where severe delay distortion is expected yet the same circuit configurations can be used with pulses in the microsecond range.

A series of field trials have been carried out to make certain that the Predicted Wave System was effective under a wide range of service conditions. One of these field tests consisted of a series of test transmissions between a Cedar Rapids, Iowa field station and Redbird Airport at Dallas, Texas. Transmission over this path was via ionosphere scatter propagation at 30 megacycles per second where very weak and deeply fading signals were obtained, and also on various high frequencies where multiple paths existed. The results of these tests have borne out the theoretical and bench test results.

It might be well to discuss a question which is bound to arise at this point. Predicted Wave System uses a simple code and narrows down the bandwidth and yet has a substantial signal to noise gain. Does not modern theory teach that we should move in exactly the opposite direction by using a complex, noise-like code and wider bands to gain in signal to noise? This seeming paradox can be resolved when it is realized that most of the new theory deals with information and coding alone. It has neglected largely the matter of detection which is in many aspects a separate subject. Improved detection is the object of Predicted Wave System—a need which has existed for a long time and which will continue to be of vital importance with any coding scheme, however complex. It is quite proper to think of using Predicted Wave System detection principles and going on to build a complex wideband code system when it is useful to exploit the wideband techniques. It must be remembered, however, that in many radio systems it is undesirable or impractical to think of band widening. Much of our useful radio spectrum is likely to remain on a narrow band basis, either because of allocation considerations or because of the physical limitations imposed by nature in the form of multipath distortion.

Referring to the drawings, Figure 1 illustrates in heavy line four pulses which are designated as: $M_1$, $M_2$, $S_1$, and $S_2$. These represent "marks" and "spaces" for the two channels. The dotted lines designated as $M_1M_2$, $M_2S_1$, $S_1S_2$, and $S_2M_1$ represent the phase of signals transmitted by the transmitter. It is to be noted that the signal $M_1M_2$ indicates that both channels 1 and 2 are "mark." The signal $S_1S_2$ represents that both signals are "space," and the other two, $M_2S_1$ and $M_1M_2$, represent, respectively, "space" in one channel and "mark" in the other. It is to be realized, also, that the phase reference of these signals is each preceding pulse and not an absolute reference.

Figure 2:
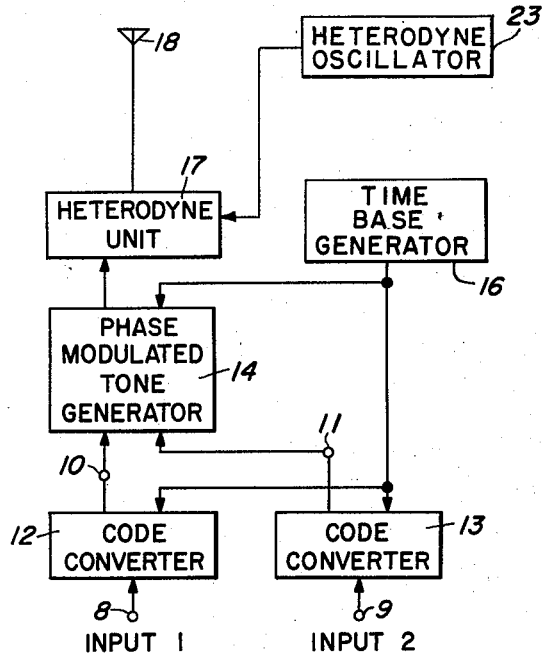
Figure 2 is a block diagram of the transmitter wherein two channels are modulated on a single tone.

With reference to Figure 2, it is to be noted that a pair of inputs are applied to terminals 8 and 9. These inputs might be messages which are to be transmitted. These messages are furnished to a pair of code converters 12 and 13 which change the message into a suitable binary code. The output of the code converters appears at terminals 10 and 11. Such apparatus is well known to those skilled in the art and might, for example, comprise an encoder such as used in teletypewriter systems. A phase modulated tone generator 14 receives inputs from the code converters 12 and 13. A time base generator 16 supplies inputs to the code converters 12 and 13, and also to the phase modulated tone generator 14 to synchronize them. The phase modulated tone generator will be described in detail hereafter. However, it performs the function of resolving the two channels of information into pulses according to Figure 1.

The output of the phase modulated tone generator 14 might be a tone of 20,000 cycles phased according to the information. This is furnished to a heterodyne unit 17 wherein it is modulated on an RF carrier for radio transmission. It might, for example, be modulated on a one megacycle signal and furnished to the antenna 18. It is to be realized, of course, that the output of the phase modulated tone generator 14 may be furnished to any transmitting system, as for example, to a wire system wherein the transmitter is connected by wire to the receiver.

The receiver is shown in Figure 3. An antenna 19 is connected to a radio frequency amplifier 21 which feeds its output to a heterodyne unit 22 of conventional type. A suitable heterodyne oscillator 23 supplies a heterodyning signal to the unit 22. A time base generator 24 is controlled by an automatic synchronizing unit 26 which adjusts the timing of the pulses supplied by the time base generator 24 to the phase shift detector 27 to coincide with the phase transitions of the incoming signal. A gated pilot tone with the incoming signal may be used as a synchronization reference by unit 26. Thus, unit 26 can be a conventional phase synchronizing unit such as a synchonization oscillator that is phase locked to the detected pilot tone. Such conventional synchronization oscillators are described in "Radio Engineering" by F. E. Terman, third edition, 1947, page 415. Thus, unit 26 synchronizes the timing (pulsing rate) of the output of time base generator 24 with the phase transitions of the incoming signal, which occur at a relatively low frequency, such as 100 cycles-per-second. An extremely high order of stability is not needed for such synchronizing pilot tone. It should be understood that such pilot tone need not be used as a reference for heterodyning the received signal, which would require a much higher order of stability. Hence, heterodyne oscillator 23 can be a local source which is stable within a few cycles-per-second of a required value, which may be 10 megacycles-per-second; but it need not maintain phase synchronism with the received signal, and therefore need not be referenced to any pilot tone.

A phase shift detector 27 receives the output of the heterodyne unit 22 and produces a pair of outputs that are furnished to terminals 28 and 29. The outputs of the two channels appear at terminals 28 and 29.

Figure 4:
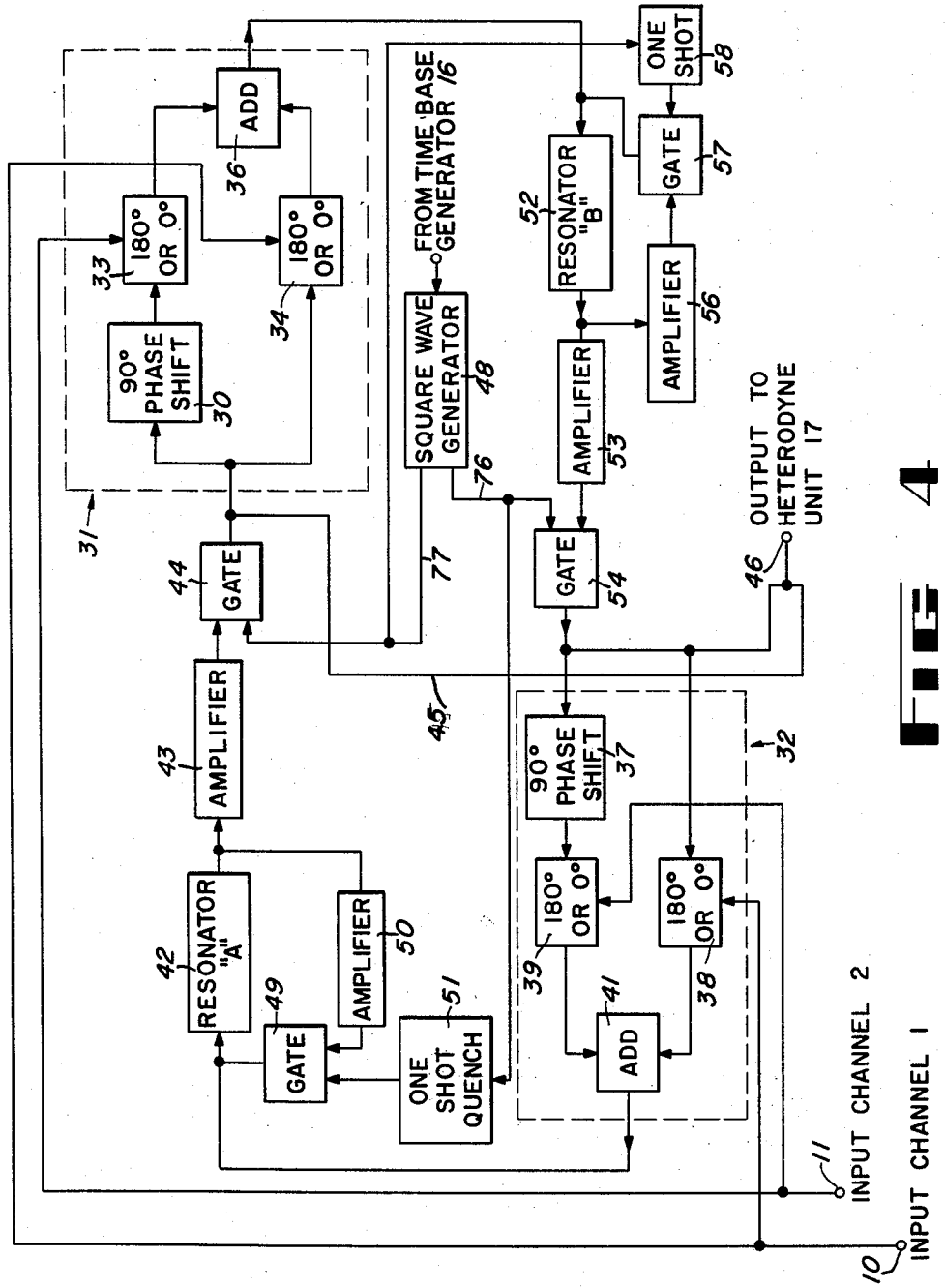
Figure 4 illustrates in detail the Quadrature Phase Shift Tone Generator of the transmitter.

The phase modulated tone generator 14 of the transmitter is shown in detail in Figure 4. Input terminal 10 is connected to a pair of phase shift circuits 31 and 32. Input terminal 11 is also connected to phase shift circuits 31 and 32. The phase shift circuits 31 and 32 are identical and phase shift circuit 31 will be described in detail.

It comprises a 90 degree phase shifter 30 which supplies its output to a unit 33 that produces an output with a phase of 180 or zero degrees with its input. Input terminal 11 is connected to this unit and the input information determines whether unit 33 produces a zero or 180 degree phase shift. The unit might comprise a ring modulator which reverses the relative input one output phase when a "mark" is received at input terminal 11. Circuits which reverse a signal by 180° in response to a control signal are well known to those skilled in the art. For example, reference may be made to Patent Nos. 2,164,402 or 2,531,474 for examples of such circuits. Another zero or 180 degree circuit 34 is connected to input terminal 10 and allows the input to pass without being reversed in phase if a "space" is present, and reverses it if a "mark" signal is present. An adding circuit 36 receives the output of units 33 and 34.

The second phase shift circuit 32 is similar to phase shift circuit 31. A ninety degree phase shift circuit 37, two 180 or zero degree units 38 and 39, and an adding circuit 41 are contained in this unit. Input terminal 10 is connected to unit 38 and input terminal 11 is connected to unit 39. The output of both of these units is supplied to the adding circuit 41.

A first resonator 42 which is resonant at the frequency of the desired tone signal receives the output of adding circuit 41 and produces an electrical output that is fed to an amplifier 43. The output of amplifier 43 is fed to a gating circuit 44 and the output of the gating circuit is fed to the 90 degree phase shift circuit 30 and unit 34 of the phase shift circuit 31. The output of gate 44 is also connected by lead 45 to output terminal 46 which connects to the heterodyne unit 17 shown in Figure 2.

The time base generator 16 shown in Figure 2 supplies an input to a square wave generator 48 which furnishes an input to the gating circuit 44.

The output of resonator 42 is also connected to an amplifier 50 that is connected to a gating circuit 49. The output of the gating circuit 49 is fed to the input of the resonator 42. The gating circuit 49 is controlled by a one shot multivibrator 51 which in turn receives an input from the square wave generator 48.

The output of adding circuit 36 is connected to the input of a second resonator 52 which might be, for example, an electromechanical resonator identical to resonator 42. The output of this resonator is furnished to an amplifier 53 whose output is in turn connected to a gating circuit 54 which receives an input from the square wave generator 48. The output of gating circuit 54 is fed to the 90 degree phase shift circuit 37 and to the 180 degree or zero phase shift unit 38 of the phase shift circuit 32.

An amplifier 56 also receives the output of the resonator 52 and its output is fed to a gating circuit 57 that receives an input from a second one shot multivibrator 58 that is controlled by a second output of the square wave generator 48. It is to be noted that the square wave generator 48 has two output terminals and these are two square waves, 180 degrees out of phase with each other. The output of the gating circuit 57 is connected to the input of the resonator 52.

The outputs of gating circuits 44 and 54 are fed to terminal 46 which is connected to the radio frequency heterodyne unit 17.

Figure 8 illustrates a resonator such as 42 and 52. It comprises a cylindrical container member 61 which has a pair of coil forms 62 and 63 mounted therein and on which are mounted coils 64 and 66. The coil forms have holes 67 and 68 formed therethrough. A resonating rod 69 extends through the coil forms and is supported at its center by a supporting disc 71. The disc 71 is tightly pressed into the cylinder 61 so as to provide a mechanical support for the resonator. Lead wires 72 and 73 are connected to coil 64 and lead wires 74 and 75 are connected to coil 66. One side of the coil 64 may be connected to ground and the other side may be the input wire. One side of the coil 66 is connected to ground and the other side is the output wire.

This resonator operates according to the principles of magnetostriction wherein the size of the rod 69 determines the resonant frequency of oscillation. The rod 69 might be made of nickel or other suitable magnetostrictive material. A rod may be tuned to the desired frequency by changing its physical dimensions. For example, if the particular tone to be used in this invention is 20,000 cycles, the rod may be carefully tuned until it resonates at 20,000 cycles. Such resonators have high Q's and thus frequencies other than 20,000 cycles will not pass except at greatly attenuated levels.

Input energy at 20,000 cycles per second will cause the resonator to ring and couple energy from the input coil 64 to the output coil 66.

Figure 9 illustrates the timing pulses used in the apparatus of Figure 4. Figure 9–A shows the output of the time base generator 16 which is fed to the square wave generator 48. It is to be noted that this comprises a plurality of pulses spaced a fixed distance "$t$" apart. One output of the square wave generator is shown in Figure 9–D. This is the output appearing at lead 76 of the square wave generator and which is fed to the gate 54 and to the one shot quench multivibrator 51. The same wave shape but reversed 180 degrees in phase is supplied by lead 77 from the square wave generator 48 to the gate 44 and to the one shot multivibrator 58. The output of the one shot multivibrator 58 is shown in Figure 9–F and the output of the one shot quench multivibrator 51 is shown in Figure 9–G.

The circuit shown in Figure 4 operates as an oscillator. It is to be noted that the output of the resonator 42 is connected to the input of the resonator 52 and vice versa. The gates 44 and 54 determine whether the resonator 42 is driving the resonator 52 or whether the resonator 52 is driving resonator 42. Stated otherwise, if the gate 44 is open, then the output of resonator 42 will be fed through the phase shift circuit 31 and to the resonator 52. Since these resonators are at the same frequency, resonator 52 will be energized. After the passage of time $t$, the gate 44 will be closed and gate 54 will be opened.

At the time gate 44 is closed, the one shot quench multivibrator 51 will energize the gate 49, which will allow the amplifier 50 to feed a portion of the output of resonator 42 back into its input but reversed 180 degrees due to the action of the amplifier. This will quench the resonator 42 because of the negative feedback action. Then, when the gate 54 is open, the resonator 52, which has continued to ring from the build-up during a prior pulse and remember the prior phase, will drive the resonator 42 through the phase shift circuit 32 for a period $t$, thus causing the resonator 42 to build up again.

At the end of the period of time $t_2$ the gate 54 will be closed and the gate 44 will be opened. At the instant gate 54 is closed the one shot multivibrator 58 operates, allowing the amplifier 56 to supply negative feedback to resonator 52, thus quenching it very quickly. Gate 57 then closes and the resonator 52 will be energized by the output of 42 again. It is to be noted that the phase shift circuits 31 and 32 are controlled by the input information supplied to input terminals 10 and 11 and thus the output of the resonators is phase shifted in accordance with the information to be transmitted. Since the resonators are quenched, they will oscillate at a phase depending upon the intelligence supplied to the phase shift oscillators 31 and 32.

The outputs of resonators 42 and 52 are connected to terminal 46.

Figure 9–B illustrates the oscillation pattern of resonator 42 and Figure 9–C illustrates the pattern of resonator 52. It is to be noted that during the first time $t_1$, resonator 42 builds up to a maximum amplitude, after which time it continues to ring during the period $t_2$ to provide a phase-memory of the prior phase-pulse. During $t_2$ it is driving the resonator 52 through the phase shift circuit 31 and resonator 52 will build up as shown in Figure 9–C beneath $t_2$. Then resonator 42 will be quenched and it will be energized by the output of resonator 52 as shown in Figure 9–B below $t_3$. This action continues.

It is to be realized that the phase (relative to the previous pulse) of the pulse appearing at the output terminal 46 depends upon the intelligence furnished to the terminals 10 and 11. This is because each of the phase shift circuits 31 and 32 are capable of providing outputs with four phases depending on the input information. At input terminal 10, there may be either of two conditions—"mark" or "space." Likewise, the input at terminal 11 may be either "mark" or "space." This gives a possibility of four combinations that result in four different outputs.

Figure 5 illustrates the phase shift detector 27 found in the receiver. The output of the heterodyne unit 22 is connected to terminal 79 which is connected to a pair of gating circuits 81 and 82 which also receive inputs from a multivibrator 83 which is controlled by the time base generator 24 shown in Figure 3. The gating circuit 81 supplies an input to a resonator 86 which is identical to the resonators 42 and 52 in the transmitter.

The output of resonator 86 is fed to a gating circuit 87 which receives an input from a one shot multivibrator 88. The output of the gating circuit 87 is connected to the input of an amplifier 84 that is connected to the input of resonator 86. The output of the resonator 86 is connected to a phase detector 89.

The gating circuit 82 receives an input from the multivibrator 83 through lead 99 which is 180 degrees out of phase with the output supplied by lead 98 to gate 81. The output of gating circuit 82 is connected to a resonator 92 similar to resonators 42, 52, and 86. The output of the resonator 92 is connected to a gate 93 which also receives an input from a one shot multivibrator 94 that is controlled by the multivibrator 83. Gating circuit 93 is connected to the input of the amplifier 91 that supplies an output to resonator 92. The output of resonator 92 is connected to the phase detector 89.

A ninety degree phase shift circuit 96 is connected to a second phase detector 97 which also receives an input from the resonator 92. Resonator 86 supplies an input to the phase shift circuit 96. The output of phase detector 89 is the output of channel 1 and is connected to terminal 95. The output of phase detector 97 is the output of channel 2 and is connected to terminal 100.

Figure 10 illustrates the wave shapes of the timing pulses utilized in the apparatus of Figure 5. Figure 10–A illustrates the output of the time base generator 24. Figure 10–B illustrates the output of the multivibrator 83 which is supplied by the lead 98 to the gate 81 and the one shot multivibrator 88. Figure 10–C illustrates the wave shape of the output of the multivibrator 83 which is supplied to the gate 82 and the one shot multivibrator 94. The output of the one shot multivibrator 88 is shown in Figure 10–D and the output of the one shot multivibrator 94 is shown in Figure 10–E. The wave shapes of the resonators 86 and 92 are shown respectively in Figures 10–F and 10–G.

It is to be noted that the input at terminal 79 is switched from the resonator 86 to the resonator 92. While the input is connected to the resonator 86, the phase detectors 89 and 97 produce outputs depending upon the phase relation of adjacent pulses transmitted.

The circuits shown and described above allow two channels to be transmitted and detected on a single tone which, in the above example, is 20,000 cycles per second. All four resonators 42, 52, 86, and 92, are resonant at this frequency. The circuit shown in Figure 4 encodes the two-channel information into the correct phase relationship and the circuit shown in Figure 5 breaks it down into two channels and decodes it. The outputs appearing at terminals 95 and 100 are identical to the inputs to terminals 10 and 11 at the receiver.

It is to be noted that no absolute phase reference is required for heterodyning in the transmitter or receiver. The time base generators 16 and 24 would be chosen so that they produce approximately equivalent outputs.

The absolute phase of the pulses is not critical. This is because each time a pulse is received, the detector compares the phase of this pulse with the phase of the preceding pulse to produce an output. Likewise, when the third pulse is received, it is compared with the second pulse, and so on. Thus, each pulse is the reference for the succeeding pulse and no absolute phase reference is needed.

It is to be realized that the principles of this invention may be utilized with diversity systems so as to decrease the probability of error.

Figure 6:
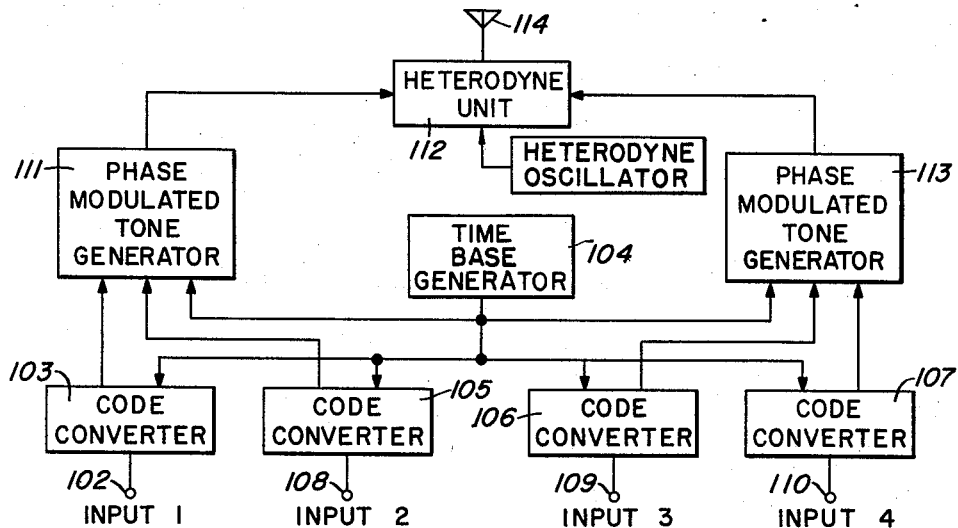
Figure 6 illustrates a transmitter for a pair of tones each modulated by a pair of channels.

The system may also be applied to a multitone system where a polarity of tones are transmitted, each tone carrying a pair of channels. Figures 6 illustrates a transmitter for accomplishing this result. Terminal 102 receives the intelligence for the first channel and is connected to a code converter 103 that supplies an input to a first phase modulated tone generator 111. Other code converters 105, 106, and 107 receive inputs respectively from terminals 108, 109, and 110. The phase modulated tone generator 111 is similar to the one shown in detail in Figure 4 and has a pair of resonators tuned to a first frequency, as for example 20,000 cycles. Its output is connected to a heterodyne unit 112. Code converters 106 and 107 supply inputs to a second phase modulated tone generator 113 which contains a pair of resonators tuned to a different frequency from those in 111, as for example 20,100 cycles per second. The output of this generator is connected to heterodyne unit 112. The heterodyne unit is connected to the radiating antenna 114.

Figure 7:
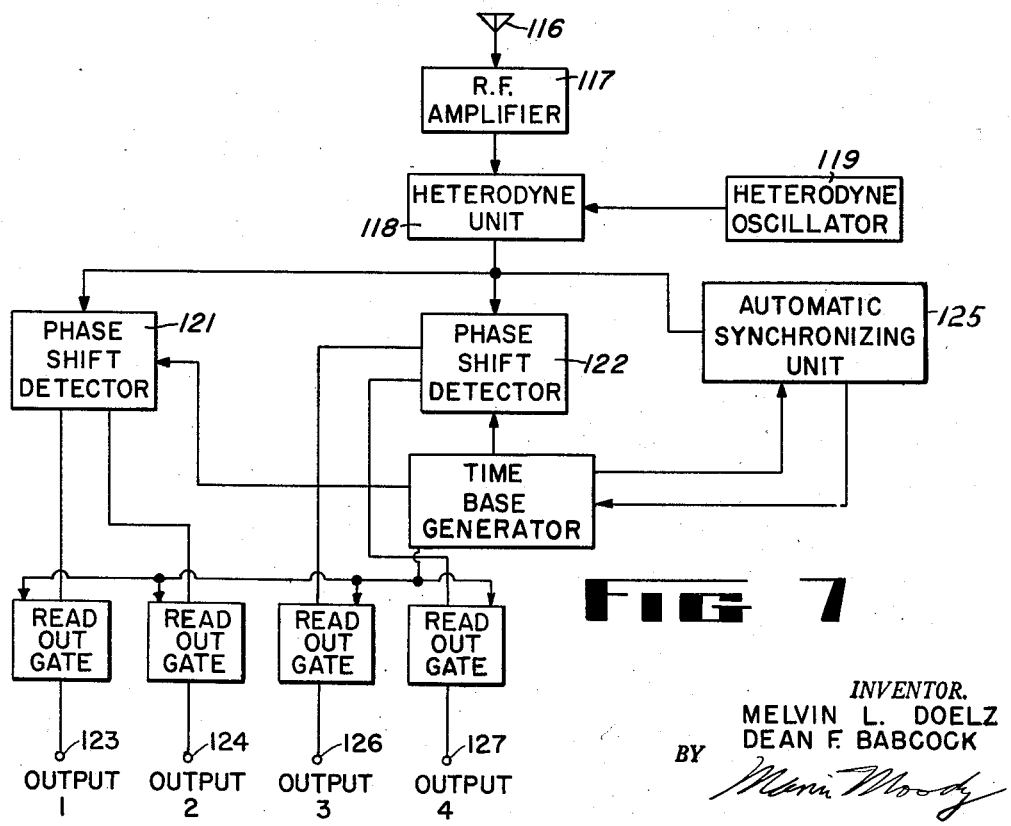
Figure 7 illustrates a receiver for detecting a pair of tones each having a pair of channels.

Figure 7 illustrates a receiving apparatus wherein a receiving antenna 116 supplies an input to a radio frequency amplifier 117 which is connected in turn to a heterodyning unit 118 which receives an input from a heterodyne oscillator 119. The output of the heterodyning unit 118 is connected to a pair of phase shift detectors 121 and 122. These units are the same as the apparatus shown in Figure 5 except they have resonators tuned to different frequencies. For example, the resonators of 121 might be tuned to 20,000 cycles and the resonators of 122 might be tuned to 20,100 cycles.

Two output terminals 123 and 124 are connected to the phase shift detector 121. A pair of outputs 126 and 127 are connected to the output of phase shift detector 122. Time base generator 128 supplies inputs to the detectors 121 and 122. Thus, Figures 6 and 7 illustrate how a pair of tones may be utilized to transmit four channels of intelligence. This may be expanded to carry as many channels as desired.

Applicant has constructed apparatus carrying 40 channels of intelligence on 20 tones which is more than twice as much information as carried on any prior systems in this bandwidth. Tone spacing is 100 cycles and thus 40 channels of intelligence are carried in 2,000 cycles of bandwidth.

The co-pending patent application entitled "Keyed Filters" discusses in further detail some of the theory relating to the use of mechanical resonators such as used in this application.

It is seen that this invention describes a new and novel communication system wherein great savings in bandwidth may be accomplished.

Although it has been described with reference to preferred embodiments, it is not to be so limited as changes and modifications may be made therein which are within the full intended scope of the invention as defined by the appended claims.

We claim:

1. In a transmitter for a communication system wherein a pair of channels are carried on a single tone and wherein the phase of said tone may be any one of four relative phases, a phase modulated tone generator comprising a pair of input terminals receiving binary information corresponding respectively to channels one and two, a pair of phase shift circuits connected to the first and second input terminals, a pair of resonators, the first resonator connected to the output of the first phase shift circuit, the second resonator connected to the output of the second phase shift circuit, the output of the first resonator connected to the input of the second phase shift circuit, the output of the second resonator connected to the input of the first phase shift circuit, a first gate connected between the first resonator and the second phase shift circuit, a second gate connected between the second resonator and the first phase circuit, a square wave generator connected to the first and second gates to alternately turn them on and off, and an output terminal connected to the outputs of the first and second gates.

2. Apparatus according to claim 1 wherein the first and second phase shift circuits comprise a pair of 180 degree or zero phase shift units with one of the input terminals connected to the first 180 degree or zero phase shift unit and the second input terminal connected to the second 180 degree or zero phase shift unit, an adding circuit connected to the outputs of the first and second 180 degree or zero phase shift units, and a ninety degree phase shift unit connected to the input of the first 180 degree or zero phase shift unit.

3. Apparatus according to claim 1 wherein the first and second phase shift circuits comprise a pair of 180 degree or zero phase shift units, the first input terminal connected to the first 180 degree or zero phase shift unit, the second input terminal connected to the second 180 degree or zero phase shift unit, an adding circuit connected to the outputs of the first and second 180 degree or zero phase shift units, and a ninety degree phase shift unit connected to the input of the first 180 degree or zero phase shift unit.

4. A phase shift detector for detecting two channels of intelligence comprising a pair of gates, an input signal which comprises a tone having any one of four phases relative to the prior tone portion connected to said gates, a multivibrator connected to said gates to alternately key them on, a pair of resonators connected to said gates, a first phase detector connected to the outputs of said resonators and producing the output intelligence contained in the first channel, a ninety degree phase shift circuit connected to the output of the first resonator, and a second phase detector connected to the output of the ninety degree phase shift circuit and to the second resonator to reproduce the intelligence in the second channel.

5. A phase shift detector for detecting two channels of intelligence comprising a pair of gates, an input signal which comprises a tone having any one of four phases relative to the prior tone portion connected to said gates, a multivibrator connected to said gates to alternately key them on, a pair of resonators connected to said gates, a first phase detector connected to the outputs of said resonators and producing the output intelligence contained in the first channel, a ninety phase shift circuit connected to the output of the first resonator, a second phase detector connected to the output of circuit ninety degree phase shift circuit and to the second resonator to reproduce the intelligence in the second channel, a first quenching circuit connected to the first resonator, a second quenching circuit connected to the second resonator, a pair of one shot multivibrators connected respectively to the first and second quenching circuits to alternately quench the resonators, and said multivibrator having opposite outputs connected to the inputs of said one shot multivibrators.

6. A system for transmitting a plurality of tones each having a pair of channels modulated thereon comprising, a transmitter, means for producing a plurality of tones in said transmitter separated by predetermined frequency intervals of $1/T$, where T is the period between discrete phase-shifts of said tones, means for phase modulating each of said tones by a pair of independent channels so that each tone has one of four relative phases determined by the intelligence, a heterodyne system receiving said plurality of tones and heterodyning them to a radio frequency, a radiating antenna attached to the heterodyne system to radiate the tones, a receiving antenna at a receiving site receiving the radiated tones, a second heterodyne system at the receiver reproducing the tones, a plurality of pairs of resonators, with each pair resonating at one of the tones in the input signal, said input tones supplied to all of said resonators, a plurality of pairs of phase detectors, with one phase detector of each pair connected to each pair of resonators that are resonating at a particular tone to produce the intelligence of one channel of each pair, a plurality of ninety degree phase shift circuits connected to one of the resonators of each pair of resonators resonating at the same tone, and a second plurality of phase detectors connected to the outputs of the phase shift circuits and the second resonator of each group to produce the other of the pairs of channels of intelligence.

7. A synchronous phase-pulse multiplex transmitting system comprising, a plurality of tone generators having frequencies spaced by $\Delta f$, a plurality of digital phase modulators respectively connected to and digitally phase-pulsing said tones to produce phase-pulses, a time-base generator connected to said modulators to actuate them and to synchronize the phase-pulses of all of said modulators at a synchronous rate, a plurality of binary-information sources respectively connected to said modulators, each of said modulators phase-shifting its received tone by a discrete amount at the beginning of each phase-pulse relative to the phase of each preceding phase-pulse in synchronism with said source to modulate its tone, said digital phase-shifted amount per phase-pulse from each modulator being correlated with information from the respectively connected binary-information sources, and the frequency spacing $\Delta f$ between adjacent tones being $$\Delta f = n\frac{1}{T}$$

where T is the duration of any of said synchronous phase-pulses, and $n$ is an integer other than zero.

8. A communication system having a transmitting system as defined in claim 7 and having a receiving system for detecting said plurality of transmitted tones, means for frequency translating the plurality of tones to a low frequency level, a plurality of phase-shift detectors, each having at least one keyed resonator tuned to a particular received tone, oscillator means for supplying a synchronous input to said keyed resonators to key them together for periodic durations T, and means for reading the outputs of said phase-shift detectors simultaneously at the end of each periodic duration T to provide the intelligence carried by the different tones.

9. A synchronous phase-pulse multiplex receiving system comprising, means for receiving a plurality of tones that are synchronously phase-pulsed, the frequency spacing among said tones being an integer multiple of $1/T$, wherein T is the duration of each phase-pulse, with the information of each phase-pulse being in a phase comparison between it and a prior phase-pulse, a receiver time-base generator providing an output, means for synchronizing the output of said time-base generator with the received phase-pulses, a plurality of phase-memory devices connected with said receiving means, each remembering the phase of each of said phase-pulses for at least one following pulse duration, means connecting the output of said time-base generator to each of said memory devices, a plurality of phase-detecting means connected with said phase-memory means for detecting the phase between each phase pulse and the phase of one of said memory devices, and a plurality of readout means for sampling simultaneously the outputs of the respective phase detectors at the end of each pulse period.

10. A synchronous phase-pulse multiplex receiving system comprising, means for receiving a plurality of tones that are synchronously phase-pulsed, said tones being spaced by integer values of $1/T$, with T being the duration of each pulse, each of said tones being simultaneously modulated by two independent channels of binary information, with each tone being modulated with a phase during each period that is one of four discrete phases with respect to the phase of the tone during its adjacent-prior pulse period, a receiver time-base generator providing an output, means for synchronizing the output of said time-base generator with the received phase-pulses, a plurality of phase-memory devices connected to said receiving means receiving said tones and oscillating with the phase of its received pulses for at least their following pulse period, a plurality of pairs of phase detectors connected with said phase-memory devices, with a pair of said detectors cooperating with one of said received tones, one of the detectors of each pair receiving and phase-comparing the received phase-pulses with the outputs of respective phase-memory devices, means connecting the output of said time-base generator to each of said memory devices, means for quenching the outputs of said phase detectors at the end of each phase pulse, a plurality of means for sampling simultaneously the output polarities of said phase detectors at the end of each phase-pulse to obtain the received information.

11. A system as defined by claim 10 in which said discrete phases are integer multiples of 45 degrees.

12. A system as defined by claim 11 in which two independent binary channels of information are simultaneously modulated per tone, with said discrete phases per tone being from the group 45°, 135°, 225° and 315°.

13. A system as defined by claim 10 in which two independent binary channels of information are simultaneously modulated per tone, the first channel having sequential mark $M_1$ and space $S_1$ information, and the second channel having independent sequential mark $M_2$ and space $S_2$ information, said two channels being coded from the following simultaneous combinations $M_1M_2$, $M_1S_2$, $S_1S_2$ and $S_1M_2$, means for synchronously modulating said tones with phase-shifts from the group 45°, 135°, 225° and 315° with respect to the immediately prior phase of said tone, with each of said phase shifts corresponding to one of said data code combinations.

References Cited in the file of this patent

UNITED STATES PATENTS

| | | |
|---|---|---|
| 2,233,183 | Roder | Feb. 25, 1941 |
| 2,337,272 | Roberts | Dec. 21, 1943 |
| 2,352,634 | Hull | July 4, 1944 |
| 2,462,759 | McCoy | Feb. 22, 1949 |
| 2,513,910 | Bliss | July 4, 1950 |
| 2,563,406 | Goldberg | Aug. 7, 1951 |
| 2,607,035 | Levine | Aug. 12, 1952 |
| 2,676,245 | Doelz | Apr. 20, 1954 |
| 2,705,795 | Fisk et al. | Apr. 5, 1955 |
| 2,708,268 | Toulon | May 10, 1955 |